United States Patent
Miller et al.

(10) Patent No.: US 12,510,418 B2
(45) Date of Patent: Dec. 30, 2025

(54) TWO-WAY THERMO-MECHANICAL SENSOR SHIELD

(71) Applicant: GM GLOBAL TECHNOLOGY OPERATIONS LLC, Detroit, MI (US)

(72) Inventors: Ronald Miller, Bloomfield Hills, MI (US); Bhaskara K Ch, Rajamundry (IN); Abhishek Kumar Sahu, Karnataka (IN); Zhun Liu, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 555 days.

(21) Appl. No.: 18/164,094

(22) Filed: Feb. 3, 2023

(65) Prior Publication Data

US 2024/0264005 A1     Aug. 8, 2024

(51) Int. Cl.
  *G01K 1/12*     (2006.01)
  *G01K 1/08*     (2021.01)
  *G01K 1/14*     (2021.01)
  *G01K 1/16*     (2006.01)

(52) U.S. Cl.
  CPC .............. *G01K 1/12* (2013.01); *G01K 1/08* (2013.01); *G01K 1/14* (2013.01); *G01K 1/16* (2013.01)

(58) Field of Classification Search
  CPC .. G01K 1/12; G01K 1/16; G01K 1/14; G01K 1/08
  USPC .......................................................... 374/208
  See application file for complete search history.

(56) References Cited

U.S. PATENT DOCUMENTS

2023/0243706 A1 *  8/2023  Simpkins ............. G01K 15/005
                                                        374/152

FOREIGN PATENT DOCUMENTS

| DE | 102017218221 A1 * | 4/2019 | ............ F24F 11/88 |
| GB | 2540362 A * | 1/2017 | ............ F24F 11/63 |
| KR | 200355561 Y1 * | 7/2004 | ............ G08B 17/10 |

OTHER PUBLICATIONS

Translation of DE102017218221A1.*

* cited by examiner

*Primary Examiner* — Mirellys Jagan
(74) *Attorney, Agent, or Firm* — Quinn IP Law

(57) ABSTRACT

A two-way thermo-mechanical shield assembly for a sensor of a heat-producing apparatus having an apparatus housing includes a first shield and a second shield. Each shield is configured to be mounted to the apparatus housing and are together configured to encase the sensor. The first shield is configured to protect the sensor from thermal energy originating internal to the apparatus housing, while the second shield is configured to protect the sensor from physical impact and thermal energy originating external to the apparatus housing.

20 Claims, 3 Drawing Sheets

TWO-WAY THERMO-MECHANICAL SENSOR SHIELD

INTRODUCTION

The present disclosure relates to a two-way thermo-mechanical shield assembly for a sensor.

A sensor is a device, module, machine, or subsystem that produces an output signal for the purpose of sensing a physical phenomenon. A sensor detects events or changes in its environment and communicates the information to another data gathering and/or processing device, such as a computer or a controller. Sensors are frequently used in everyday objects and machines to enable effective operation and control thereof. Sensors have been traditionally used for detecting force, pressure, temperature, and fluid flow. There is also a wide range of sensors that measure chemical and physical properties of materials. Sensors may be analog or digital.

Sensor applications may include manufacturing and machinery, airplanes and aerospace, automobiles, medicine, robotics, and many other aspects of day-to-day life. Although a sensor may affect a system in which it is used, sensors are usually designed to have a small effect on what is measured. A sensor's sensitivity indicates the sensor's ability to react to a measured stimulus, i.e., how much the sensor's output changes in response to a change in the input quantity being measured. Sensor sensitivity and precision are important for enabling desired control and operation of systems and machines. Sensor performance and sensitivity may be affected by physical factors, such as contamination, temperature extremes, vibration, and impact.

SUMMARY

A two-way thermo-mechanical shield assembly for a sensor of a heat-producing apparatus having an apparatus housing includes a first shield and a second shield. Each shield is configured to be mounted to the apparatus housing and are together configured to encase the sensor. The first shield is configured to protect the sensor from thermal energy originating internal to the apparatus housing, while the second shield is configured to protect the sensor from physical impact and thermal energy originating external to the apparatus housing.

Each of the first and second shields may be constructed from a thermal energy insulating and impact resistant material.

The thermal energy insulating and impact resistant material may be a metal.

The first shield may include a boxed structure including a center section and four side sections extending therefrom. In such an embodiment, each side section of the boxed structure may extend at a 90-degree angle from the center section.

Each of the four side sections of the boxed structure may include a flange configured to facilitate mounting of the first shield to the apparatus housing.

One of the four side sections of the boxed structure may define an opening for an electrical connection to the sensor.

The second shield may include a cage structure having a center section and four side sections extending therefrom. Each side section of the cage structure may be arranged at an angle smaller than 90 degrees relative to the center section.

Each of the four side sections of the cage structure may define a vent opening configured to facilitate circulation of air through the second shield from an environment external to the apparatus housing.

Each of the four side sections of the cage structure may include a flange configured to facilitate mounting of the second shield to the apparatus housing.

The sensor may be configured to detect ambient temperature of an environment external to the apparatus housing.

A heat-producing apparatus including the sensor encased by the two-way thermo-mechanical shield is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
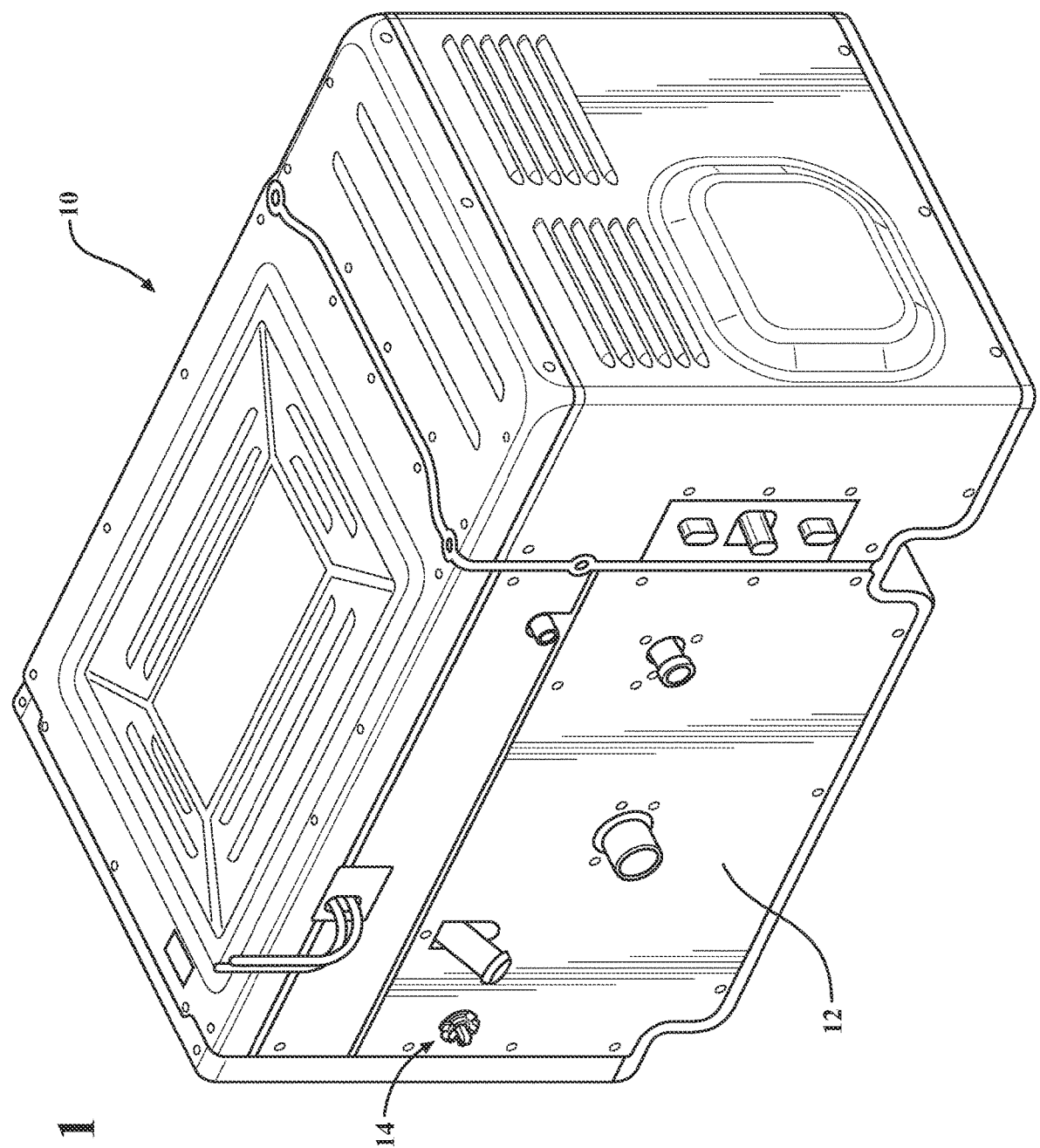
FIG. 1 is a schematic perspective view of a heat-producing apparatus, specifically depicted a fuel cell power cube, and having an apparatus housing, according to the present disclosure.

Those having ordinary skill in the art will recognize that terms such as "above", "below", "upward", "downward", "top", "bottom", "left", "right", etc., are used descriptively for the figures, and do not represent limitations on the scope of the disclosure, as defined by the appended claims. Referring to the drawings, wherein like reference numbers refer to like components, FIG. 1 shows a heat-producing apparatus 10. The apparatus 10 is generally a machine that generates thermal energy, for example, as a primary function or a byproduct of producing motive power, such as an electric heating unit, a steam or gas turbine, a fuel cell power cube (shown in FIG. 1), or an internal combustion engine.

Figure 2:
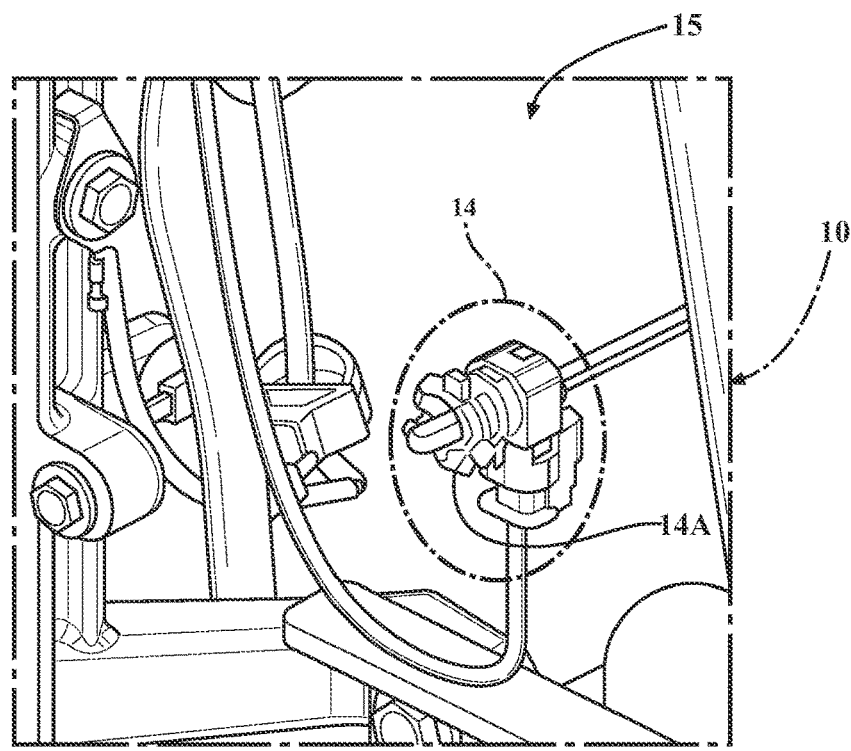
FIG. 2 is a schematic close-up perspective partial view of the heat-producing apparatus shown in FIG. 1 with a housing panel removed, illustrating a sensor arranged on the apparatus, according to the disclosure.

As shown in FIG. 1, the heat-producing apparatus 10 includes an apparatus housing 12. The apparatus housing 12 is configured to retain and cover various components of the apparatus 10 and shelter the inner workings of the apparatus from disruptive external forces. Although not shown, the apparatus housing 12 may include a housing frame and panels either permanently or removably attached to the frame. As shown in FIG. 2, the heat-producing apparatus 10 also includes a sensor 14 mounted to the apparatus housing 12, such as via one or more fasteners 14A. The sensor 14 may be configured to detect various environmental and apparatus performance parameters and communicate the gathered information to a computer or a controller (not shown). The sensor 14 may, for example, be configured to detect ambient temperature of an environment 15 external to and surrounding the apparatus housing 12. However, with the sensor 14 being in relatively close proximity to an internal source of thermal energy of the apparatus 10, may affect the sensor's ability to detect and communicate changes in its environment.

Figure 3:
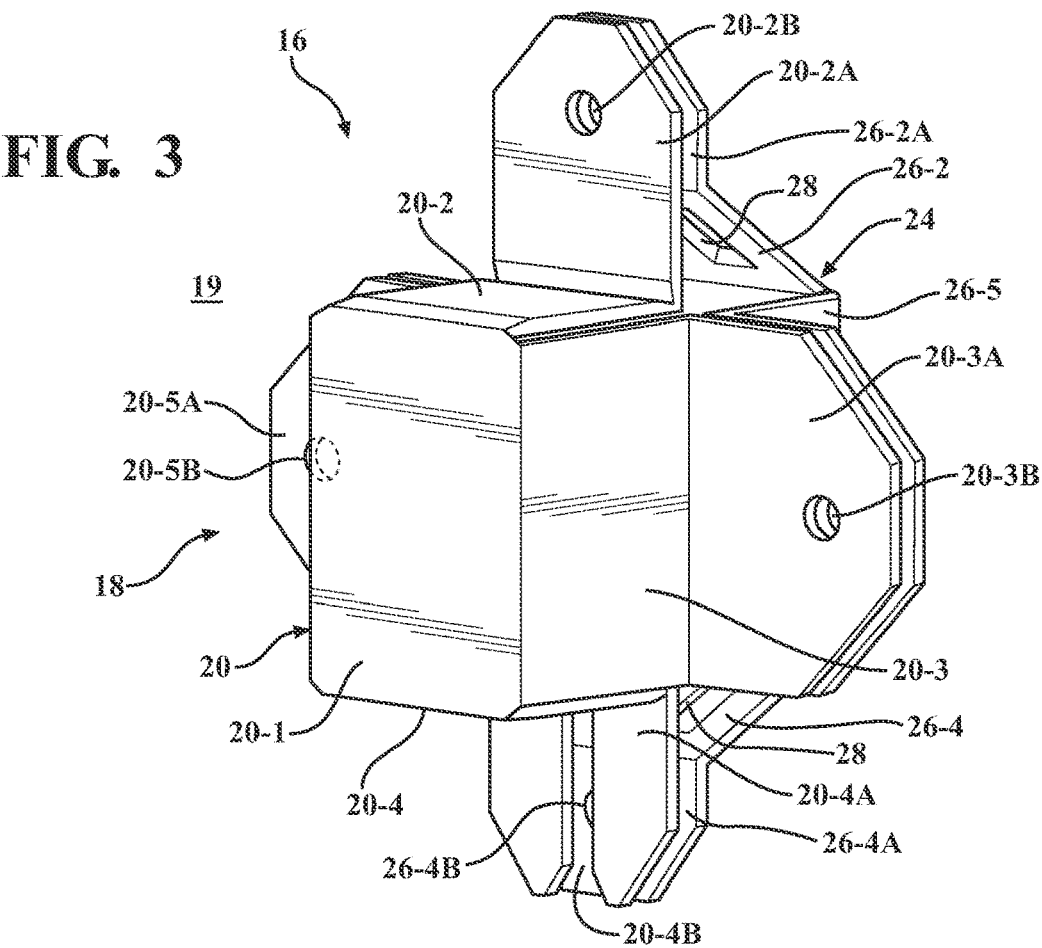
FIG. 3 is a schematic close-up perspective view of the two-way thermo-mechanical shield assembly for the sensor shown in FIG. 2 from a viewpoint of environment internal to the fuel cell power cube, specifically illustrating the inner shield, according to the disclosure.

As shown in FIG. 3, the heat-producing apparatus 10 additionally includes a two-way thermo-mechanical shield assembly 16. The shield assembly 16 includes a first or inner shield 18 and a second or outer shield 24. Each of the inner and outer shields 18, 24 is mounted to the apparatus housing 12 and together encase the sensor 14, such that the sensor is positioned between the two shields. As a result, the inner and outer shields 18, 24 surround and generally enclose the sensor 14. Specifically, the inner shield 18 is configured to protect, such as screen and cover, the sensor 14 from thermal energy originating internal to the apparatus housing 12, i.e., internal apparatus environment 19. In other words, the inner shield 18 is designed and structured to guard the sensor 14 from high temperatures generated by the heat-producing apparatus 10 during its operation.

Figure 4:
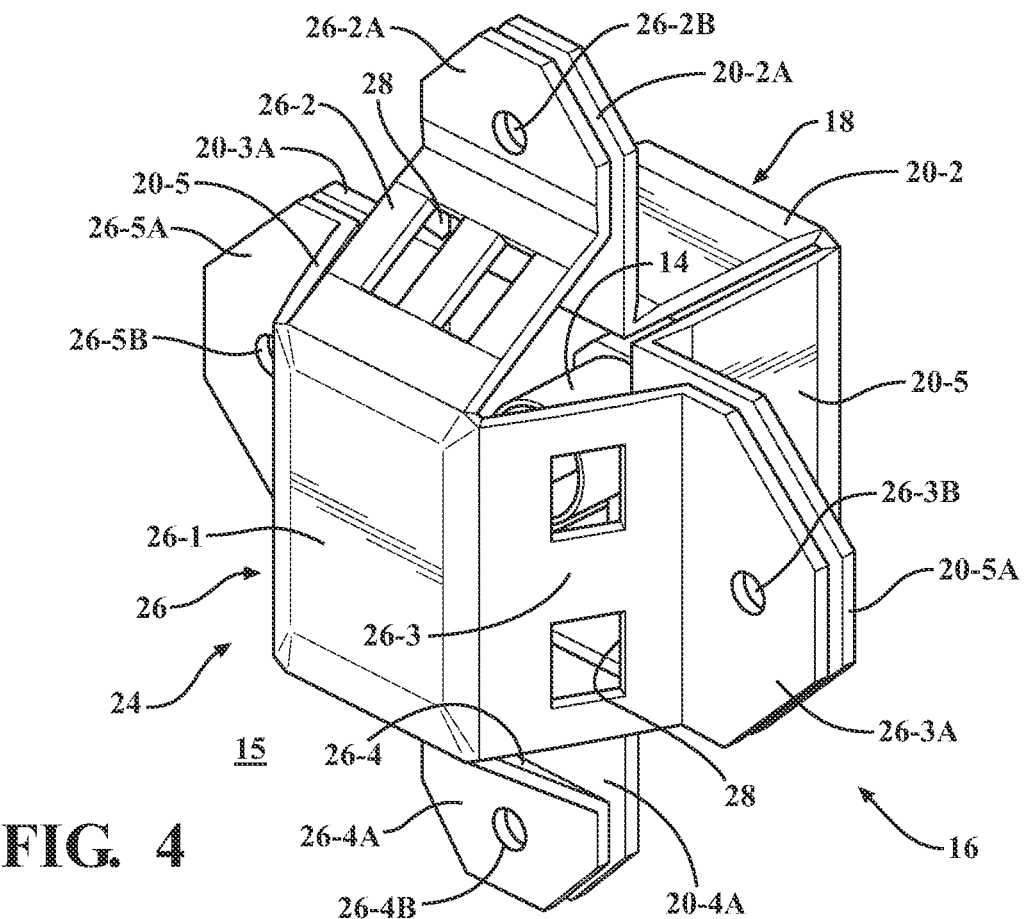
FIG. 4 is a schematic close-up perspective view of a two-way thermo-mechanical shield assembly for the sensor shown in FIG. 2 from a viewpoint of environment external to the fuel cell power cube, specifically illustrating the outer shield, according to the disclosure.

With continued reference to FIG. 3, the inner shield 18 may include a boxed or tub-shaped structure 20. The boxed structure 20 may include a center section 20-1 and four side sections 20-2, 20-3, 20-4, and 20-5 extending therefrom. As may be seen in FIG. 4, each side section 20-2, 20-3, 20-4, 20-5 may extend at a substantially 90-degree angle $\theta_1$ from the center section 20-1. Accordingly, when the sensor 14 and inner and outer shields 18, 24 are installed on the heat-producing apparatus 10, the inner shield will surround the sensor relative to the interior of the apparatus housing 12. Each of the four side sections 20-2, 20-3, 20-4, 20-5 may include a respective flange 20-2A, 20-3A, 20-4A, 20-5A configured to facilitate mounting of the inner shield 18 to the apparatus housing 12 by defining a respective hole 20-2B, 20-3B, 20-4B, 20-5B for an appropriate fastener, such as a bolt or a screw. Additionally, one of the four side sections 20-2, 20-3, 20-4, 20-5 may define an opening 22 to permit a pass-through for an electrical connection to the sensor 14.

Figure 5:
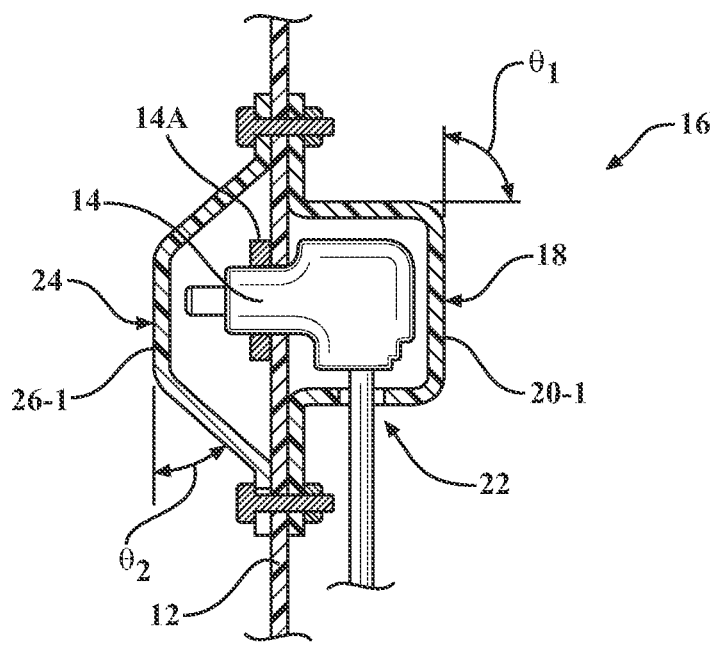
FIG. 5 is a schematic close-up cross-sectional side view of the two-way thermo-mechanical shield assembly shown in FIG. 3 with an encased sensor, as installed in the heat-producing apparatus, according to the disclosure.

As shown in FIG. 5, the outer shield 24 is configured, i.e., designed and structured, to protect the sensor 14 from physical impact, such as due to blunt object force or large debris, originating external to the apparatus housing 12. The outer shield 24 is further configured to screen and protect the sensor 14 from thermal energy originating external to the apparatus housing, such as from the sun. The outer shield 24 may include a cage structure 26 having a center section 26-1 and four side sections 26-2, 26-3, 26-4, and 26-5 extending therefrom. As may be seen in FIG. 5, each side section 26-2, 26-3, 26-4, 26-5 may be arranged at an acute angle $\theta_2$, i.e., an angle smaller than 90 degrees, relative to the center section 26-1. The acute angle $\theta_2$ of the sides sections 26-2, 26-3, 26-4, 26-5 is configured to provide additional stiffness the cage structure 26 in case of a physical impact, especially if the force of such an impact is not aligned with and perpendicular to the center section 26-1.

Each of the four side sections 26-2, 26-3, 26-4, 26-5 may define one or more vent openings 28 configured to facilitate circulation of air through the second shield 24 and over the encased sensor 14 from the environment 15 external to the apparatus housing 12. Accordingly, the outer shield 24 may be constructed to facilitate removal of thermal energy from the sensor 14. Each of the four side sections 26-2, 26-3, 26-4, 26-5 may additionally include a respective flange 26-2A, 26-3A, 26-4A, 26-5A configured to facilitate mounting of the second shield 24 to the apparatus housing 12. Furthermore, each of the four flanges 26-2A, 26-3A, 26-4A, 26-5A may define a respective hole 26-2B, 26-3B, 26-4B, 26-5B for an appropriate fastener, such as a bolt or a screw, to facilitate mounting of the outer shield 24 to the apparatus housing 12.

Positioning of the holes 20-2B, 20-3B, 20-4B, 20-5B in the respective flanges 20-2A, 20-3A, 20-4A, 20-5A may coincide with positioning of the holes 26-2B, 26-3B, 26-4B, 26-5B in the respective flanges 26-2A, 26-3A, 26-4A, 26-5A when the inner shield 18 and the outer shield 24 are mounted to the apparatus housing 12 for encasing the sensor 14. Such coordinated positioning of the holes 20-2B, 20-3B, 20-4B, 20-5B and the holes 26-2B, 26-3B, 26-4B, 26-5B may thereby facilitate mounting of the inner and outer shields 18, 24 to the apparatus housing 12 via common fasteners. Each of the inner and outer shields 18, 24 may be constructed from a thermal energy insulating and impact resistant material, such as metal.

Overall, the shield assembly 16 is intended to provide two-way thermo-mechanical protection for a sensor, such as the sensor 14, arranged on an apparatus or a machine to detect a specific parameter. Such a sensor may be exposed to high levels of thermal energy generated by the apparatus and physical impact, as well as heat, from external source(s). Having two shield components, one covering the sensor from internal apparatus heat and the other from external impact, the shield assembly 16 is configured to protect the subject sensor and facilitate its reliable and consistent performance. Additionally, the external component of the shield assembly 16 may be vented to facilitate cooling of the encased sensor.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A heat-producing apparatus comprising:
   an apparatus housing;
   a sensor mounted to the apparatus housing; and
   a two-way thermo-mechanical shield assembly having a first shield and a second shield, each mounted to the apparatus housing, and together encasing the sensor, wherein:
   the first shield is configured to protect the sensor from thermal energy originating internal to the apparatus housing;
   the first shield includes a boxed structure including a center section and four side sections extending therefrom, and wherein each side section of the boxed structure extends at a 90-degree angle from the center section;
each of the four side sections of the boxed structure includes a flange configured to facilitate mounting of the first shield to the apparatus housing; and
the second shield is configured to protect the sensor from physical impact and thermal energy originating external to the apparatus housing.

2. The heat-producing apparatus of claim 1, wherein one of the four side sections of the boxed structure defines an opening for an electrical connection to the sensor.

3. The heat-producing apparatus of claim 1, wherein the sensor is configured to detect an ambient temperature of an environment external to the apparatus housing.

4. The heat-producing apparatus of claim 1, wherein each of the first and second shields is constructed from a thermal energy insulating and impact resistant material.

5. The heat-producing apparatus of claim 4, wherein the thermal energy insulating and impact resistant material is a metal.

6. The heat-producing apparatus of claim 1, wherein the second shield includes a cage structure having a center section and four side sections extending therefrom, and wherein each side section of the cage structure is arranged at an angle smaller than 90 degrees relative to the center section.

7. The heat-producing apparatus of claim 6, wherein each of the four side sections of the cage structure defines a vent opening configured to facilitate circulation of air through the second shield from an environment external to the apparatus housing.

8. The heat-producing apparatus of claim 6, wherein each of the four side sections of the cage structure includes a flange configured to facilitate mounting of the second shield to the apparatus housing.

9. A two-way thermo-mechanical shield assembly for a sensor of a heat-producing apparatus having an apparatus housing, the shield assembly comprising:
a first shield and a second shield, each configured to be mounted to the apparatus housing and together configured to encase the sensor, wherein:
the first shield is configured to protect the sensor from thermal energy originating internal to the apparatus housing;
the first shield includes a boxed structure including a center section and four side sections extending therefrom, and wherein each side section of the boxed structure extends at a 90-degree angle from the center section;
each of the four side sections of the boxed structure includes a flange configured to facilitate mounting of the first shield to the apparatus housing; and
the second shield is configured to protect the sensor from physical impact and thermal energy originating external to the apparatus housing.

10. The two-way thermo-mechanical shield of claim 9, wherein one of the four side sections of the boxed structure defines an opening for an electrical connection to the sensor.

11. The two-way thermo-mechanical shield of claim 9, wherein each of the first and second shields is constructed from a thermal energy insulating and impact resistant material.

12. The two-way thermo-mechanical shield of claim 11, wherein the thermal energy insulating and impact resistant material is a metal.

13. The two-way thermo-mechanical shield of claim 9, wherein the second shield includes a cage structure having a center section and four side sections extending therefrom, and wherein each side section of the cage structure is arranged at an angle smaller than 90 degrees relative to the center section.

14. The two-way thermo-mechanical shield of claim 13, wherein each of the four side sections of the cage structure defines a vent opening configured to facilitate circulation of air through the second shield from an environment external to the apparatus housing.

15. The two-way thermo-mechanical shield of claim 13, wherein each of the four side sections of the cage structure includes a flange configured to facilitate mounting of the second shield to the apparatus housing.

16. A heat-producing apparatus comprising:
an apparatus housing;
a sensor configured to detect an ambient temperature of an environment external to the apparatus housing; and
a two-way thermo-mechanical shield assembly having a first shield and a second shield, each mounted to the apparatus housing, and together encasing the sensor, wherein:
the first shield includes a boxed structure configured to protect the sensor from thermal energy originating internal to the apparatus housing;
the boxed structure includes a center section and four side sections extending therefrom, and wherein each side section of the boxed structure extends at a 90-degree angle from the center section;
each of the four side sections of the boxed structure includes a flange configured to facilitate mounting of the first shield to the apparatus housing; and
the second shield includes a cage structure configured to protect the sensor from physical impact and thermal energy originating external to the apparatus housing and is vented to facilitate cooling of the sensor.

17. The heat-producing apparatus of claim 16, wherein one of the four side sections of the boxed structure defines an opening for an electrical connection to the sensor.

18. The heat-producing apparatus of claim 16, wherein the cage structure of the second shield includes a center section and four side sections extending therefrom, and wherein each side section of the cage structure is arranged at an angle smaller than 90 degrees relative to the center section.

19. The heat-producing apparatus of claim 16, wherein each of the first and second shields is constructed from a thermal energy insulating and impact resistant material.

20. The heat-producing apparatus of claim 19, wherein the thermal energy insulating and impact resistant material is a metal.

* * * * *